Sept. 21, 1948.  H. L. BURNS  2,449,548
AUTOMATIC CONTROL SYSTEM FOR
HIGH ALTITUDE PRESSURE SUITS
Filed Jan. 3, 1946

INVENTOR
HENRY L. BURNS

BY
HIS ATTORNEYS

Patented Sept. 21, 1948

2,449,548

UNITED STATES PATENT OFFICE 2,449,548

AUTOMATIC CONTROL SYSTEM FOR HIGH ALTITUDE PRESSURE SUITS

Henry L. Burns, Yellow Springs, Ohio

Application January 3, 1946, Serial No. 638,902

6 Claims. (Cl. 128—144)

(Granted under the act of March 3, 1883, as amended April 30, 1928; 370 O. G. 757)

The invention described herein may be manufactured and used by or for the Government for governmental purposes without payment to me of any royalty thereon.

This invention relates to an automatic pressure controlling system for pressure suits for use in operating aircraft at high altitudes.

In operating aircraft at high altitudes such as altitudes exceeding 10,000 feet, it is essential that the aviator be supplied with oxygen from a source of supply carried by the aircraft as the atmosphere does not contain sufficient oxygen to supply the human need. In operation of aircraft at higher altitudes than 30,000 feet, it is also necessary to provide the body of the aviator with additional pressure as the atmospheric pressure decreases. One method of supplying this additional oxygen and pressure is by the use of pressure suits. The pressure suit now in use must be manually regulated to maintain the desired pressure as the aircraft reaches varying levels of altitude necessitating constant vigilance on the part of the aviator to avoid the physical reaction resulting from inadequate oxygen and pressure and in many instances the operation of aircraft, as in combat, requires the undivided attention of the aviator. It is an object of this invention to provide a control system for high altitude pressure suits that will automatically adjust the pressure within the suit to meet the needs of the aviator in accordance with the atmospheric condition of the various altitudes.

In operation of aircraft over great distances, especially in the case of combat aircraft where heavy loads of fuel, freight, or armament and bombs are carried conservation of weight is of prime importance. Oxygen tanks are of considerable weight and consequently it is essential that the supply of oxygen carried by the aircraft be limited and that the oxygen carried be conserved, especially in the case of combat aircraft where security requires constant operation at high altitudes. It is an object of this invention to provide a control system for high altitude pressure suits that will conserve the supply of oxygen carried by the aircraft by a novel means of mixing air from the atmosphere with the oxygen gas at those altitudes where dilution of feasible and to regulate the dilution as a function of altitudes.

It is a further object of the invention to provide a pressure controlled suit that will permit the wearer to descend rapidly from high altitudes as in the case of a parachute jump, without injury to the wearer from freezing temperatures at high altitude and the lack of oxygen and that will automatically prevent the stored oxygen within the suit from escaping during the descent and that will automatically permit the inflow of air when the wearer reaches altitudes having sufficient pressure to permit atmospheric breathing.

The above and other objects will be apparent from the following description and illustrated in the accompanying drawings wherein.

Figure 1:
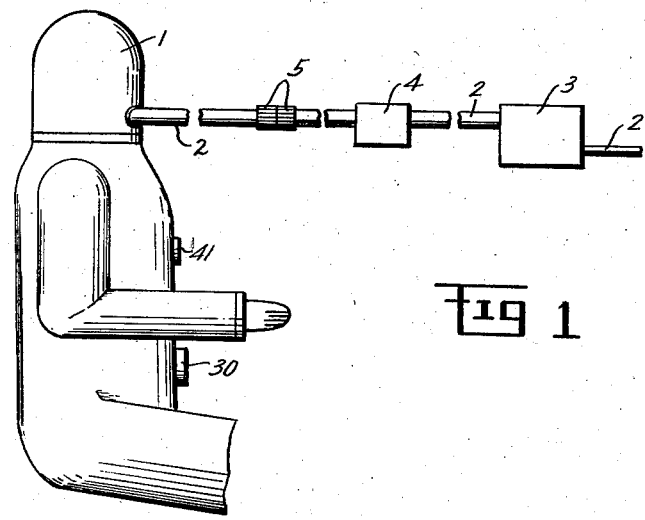
Fig. 1 is a diagrammatic view of the high altitude pressure control assembly.

Referring now more particularly to the drawings, the numeral 1 indicates a conventional high altitude pressure suit. Oxygen from the conventional container (not shown) flows in to the suit through the line 2 passing first into the pressure flow and dilution regulator 3, more particularly shown in Fig. 2, thence into the conventional heater 4 and into the suit 1. The line 2, which is usually a flexible hose, has the telescoping connections 5, 5 in which are mounted suitable valves (not shown) to seal both connections in the event the line is disconnected as in the case of a bail-out.

Figure 2:
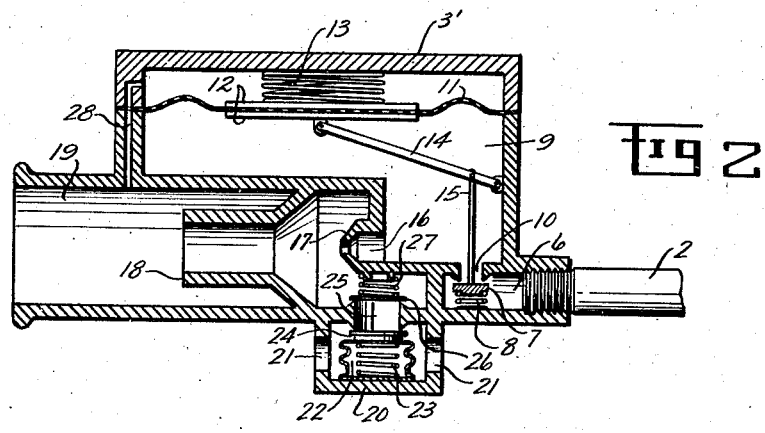
Fig. 2 is a cross-sectional side view of the pressure flow and dilution regulator.

The pressure flow and dilution regulator shown in Fig. 2 has the inlet port 6 which is internally threaded to receive the external threads of the oxygen line 2. A valve 7, having a booster spring 8 controls the flow of oxygen into the pressure chamber 9 through the port 10. A diaphragm 11 constructed of flexible material such as rubber is anchored in the walls of the regulator housing 3' and has the metal discs 12, 12 embracing the central portion thereof. Mounted on the upper disc 12 and anchored against the upper wall of the regulator housing 3' is a coil spring 13 which is set to exert a pressure of approximately 5 pounds per square inch of effective diaphragm area. Pivotally mounted in the center of the lower disc 12 is the lever 14; the opposing end of said lever being pivotally mounted on the side wall of the regulator housing 3'. Pivotally mounted on the lever 14 adjacent the regulator housing side wall end thereof is a plunger 15, the opposing end of said plunger being connected with the valve 7 so that the longitudinal movement of the diaphragm 11 will open or close the valve 7. An orifice 16 having the nozzle 17 regulates the flow of oxygen from the chamber 9 into the venturi 18 and thence through the port 19 into that part of the line 2 beyond the regulator 3. Beneath the port 16 is the dilution regulator housing 20 having the intake ports 21, 21. Seated in the housing 20 is the evacuated bellows 22 in which is mounted the coil spring 23. A valve 24 mounted on the upper end of the bellows 22 controls the flow of air through the port 25. A valve 26 with a light coil spring 27 acts as a check valve preventing the escape of oxygen gas through the port 25. A passageway 28 leading from the line 2 to the suit 1 extends through the wall of the regulator housing 3' and through the anchored portion of the diaphragm 11 into the area between the diaphragm 11 and the upper wall of the regulator housing. The oxygen flows through the port 6 and port 10 into the pressure chamber 9 and through the port 16 and venturi 18 and thence through the line 2 into the heater 4 and thence through the line to the suit 1. The upper surface of the diaphragm 11 is subject to the pressure of the suit transmitted through the passageway 28 from the line 2 and a pressure differential is maintained by the spring 13. The flow of oxygen into the pressure chamber 9 will act against the diaphragm 11 and when the aircraft is operating at a preselected altitude such as an altitude of 30,000 feet or greater, the pressure on the diaphragm will be stabilized and the flow of oxygen to the suit will be constant, however, if the pressure of oxygen in the pressure chamber exceeds that required at the predetermined altitude, such as 30,000 feet, the diaphragm will be moved upwardly closing the valve 7 and preventing further flow of oxygen into the pressure chamber until the pressure is again stabilized with the predetermined differential across the diaphragm.

Figure 3:
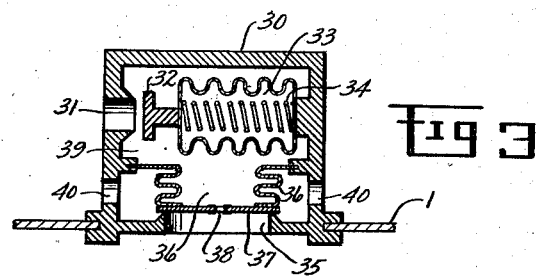
Fig. 3 is a cross-sectional side view of the automatic suit pressure control.

The pressure within the suit is maintained at that required for the predetermined altitude, such as 30,000 feet, by means of the suit pressure regulator as shown in Fig. 3 of the drawings. The regulator housing 30 is sealed in the wall of the suit 1 and has the exhaust port 31 controlled by the valve 32 which is operated by the evacuated bellows 33. The bellows 33 is constructed of light metal or similar flexible material, having the spring 34 mounted therein. The bellows 33 and the spring 34 are set to expand and move the valve 32 against the port 31 at a predetermined atmospheric pressure, such as the pressure of 30,000 feet of altitude. While operating in altitudes less than the maximum, the atmospheric pressure sensitive bellows 33 will gradually contract, opening the valve 32, permitting the pressure within the suit to be correspondingly reduced. In the wall of the housing 30 is the port 35 of a relatively large circumference, leading into the pressure suit and the valve 36 consisting of a bellows of rubber or other suitable material of predetermined tension having one end anchored in the wall of the housing 30 and a disc 37 closing port 35 secured to the other end of said bellows 36. A small orifice 38 provides a vent through the disc 37, permitting the pressure of the suit to be transmitted to the pressure chamber 39. Exhaust ports 40, 40 permit gas in the suit to escape when the pressure within the suit exceeds that of the predetermined altitude such as 30,000 feet by said suit pressure being greater than that in the chamber 39 acting on the disc 37 to move same away from the port 35.

In use the desired pressure of the suit is determined and the oxygen regulator of the aircraft is set in the conventional manner. Assuming said pressure to be that attained at 30,000 feet, the suit is put on by the aviator and the line connections 5, 5 are joined. As the aircraft leaves the ground and at all times until the pressure of the predetermined altitude is reached oxygen flows into the chamber 9 through the port 16 and through the nozzle 17 and venturi 18. While operating at less than the predetermined maximum altitude, the high density of the oxygen gas tends to permit lesser flow through the nozzle 17. The flow of oxygen through the nozzle 17 and venturi 18 creates a negative pressure around the port 25 which draws air in through the ports 21, 21 which mixes with the supply of oxygen gas to bring the flow up to the necessary minimum of 100 liters per minute to the aviator. The evacuated bellows 22 controlling the valve 24 reacts to atmospheric pressure and will expand with the increase of altitude until at the predetermined pressure, such as that of 30,000 feet, the valve will be entirely closed and the back pressure valve 26 will move tightly against the port 25 preventing any leak of oxygen. The gradual closing of the valve 24 also acts to gradually reduce the amount of air from the atmosphere that is mixed with the oxygen gas as the value of said air decreases with the increased altitude and the density of the oxygen becomes correspondingly lower so that the necessary minimum of 100 liters per minute to the aviator is maintained.

In the event of an emergency necessitating abandonment of the aircraft at high altitudes, the aviator may disconnect the connections 5, 5 and jump from the aircraft in the usual manner. The suit will be immediately sealed against loss of pressure and as the aviator passes down to levels of atmosphere below 30,000 feet without exposing himself to the extreme colds of the high altitude, the pressure of the oxygen stored within the suit will be maintained and the use of a conventional bail out bottle will provide breathing oxygen during the rapid descent to the lower altitudes. As the aviator passes into lower altitude levels, a suitable pressure sensitive check valve 41 permits air to be drawn into the suit in an amount in accordance with the atmospheric pressure.

The embodiments of the invention herein shown and described are to be regarded as illustrative only, and it is to be understood that the invention is susceptible to variation, modification, and change within the scope of the appended claims.

I claim:

1. An automatic pressure control system for high altitude flying comprising a pressure suit, a source of oxygen supply having a constant preregulated pressure flow, means for automatically regulating said pressure flow including a differential pressure responsive actuating means in opposing fluid pressure communication with the source of oxygen supply and the pressure suit, and means mounted in said pressure suit for regulating the pressure within said pressure suit in accordance with the various altitudes and to maintain a constant pressure at a preselected altitude in altitudes higher than the preselected altitude whereby the flow of oxygen through the pressure suit is controlled in accordance with the differential pressure acting on said pressure responsive actuating means by pressure in said pressure suit as determined by the suit pressure regulating means and the oxygen supply pressure to sufficiently supply oxygen to a wearer of the pressure suit in all altitudes.

2. In an automatic pressure controlling system for high altitude flying comprising a pressure suit, a source of oxygen supply providing a flow of oxygen at a predetermined pressure to said pressure suit, a pressure regulator between said oxygen supply and said pressure suit having a pressure sensitive diaphragm subject on one surface to the pressure of the pressure suit and on the opposing surface to the pressure of the incoming oxygen, said diaphragm having a pressure differential means exerting pressure on one surface and means on the opposing surface in operating connection with means for controlling flow of oxygen into said pressure regulator, a restricted nozzle through which the flow of oxygen from said regulator is limited, a venturi through which said oxygen passes, a port in said regulator within the negative pressure area created by said venturi through which air from the surrounding atmosphere passes, atmospheric pressure sensitive means controlling the flow of air into the oxygen stream through said ports, means for preventing the escape of oxygen through said port, and atmospheric pressure sensitive means mounted in said suit for controlling the pressure of said pressure suit and said one surface of the pressure regulator diaphragm in accordance with the available atmospheric pressure, the atmospheric pressure sensitive means maintaining a constant preselected pressure after attaining a predetermined altitude.

3. In an automatic pressure controlling system for high altitude flying comprising a pressure suit, means for regulating the flow of oxygen at a predetermined pressure from a source of supply to said suit by differential pressure operating means being subjected to opposing pressure from the oxygen source and the pressure suit, means for dilution of said oxygen with air from the free atmosphere in quantities determined by the respective altitude, means for regulating the pressure within said suit comprising a housing mounted in the wall of said suit, an atmospheric pressure sensitive spring loaded evacuated bellows mounted in said housing, a port in said housing leading to the free atmosphere, a valve mounted on said bellows controlling said port, a port leading from said suit to the pressure chamber formed by said housing, a flexible bellows anchored at one end to the walls of said housing and having a valve at the other end controlling said port, a relatively small vent through said valve permitting the pressure of the suit to be transmitted to the pressure chamber, a series of exhaust apertures in said housing permitting gas from the suit to escape to the free atmosphere when the predetermined pressure is exceeded.

4. An automatic pressure control system for high altitude flying comprising a pressure suit, a source of oxygen supply having a constant preregulated pressure flow, valve means for automatically regulating the pressure flow including differential pressure responsive valve actuating means in opposing fluid pressure communication with the source of oxygen supply and the pressure suit, means for diluting the oxygen with air from the free atmosphere proportional to the altitude, and pressure regulating valve means in the pressure suit for regulating the pressure in the pressure suit in accordance with the various altitudes and to maintain a constant pressure at a preselected altitude in altitudes higher than the preselected altitude whereby the pressure in the pressure suit effects operation of the first mentioned valve means together with the pressure of the oxygen source to control the oxygen flow into the pressure suit in various altitudes sufficient for a wearer of the pressure suit at these altitudes.

5. An automatic pressure control system for high altitude flying comprising a pressure suit, a source of oxygen supply having a constant preregulated flow in fluid communication with said pressure suit, means regulating said pressure flow of oxygen in conformity with the need of a user of said pressure suit at various altitudes including differential pressure responsive actuating means for automatically controlling said first mentioned means, said differential pressure responsive actuating means connected in fluid pressure opposing relation with said oxygen supply source and said pressure suit for actuating said first mentioned means in accordance with oxygen demand as determined by available oxygen supply pressure and suit demand pressure, dilution valve means arranged between said first mentioned means and said pressure suit for diluting the oxygen with air from the free atmosphere in proper varying amounts in relation to the various altitudes, relief valve means mounted in said pressure suit for regulating the pressure within said pressure suit in accordance with the various altitudes and adapted to maintain said pressure constant at that of a preselected altitude in altitudes higher than the preselected altitude and to remain closed in the absence of oxygen being admitted to said pressure suit, and a check valve mounted in said pressure suit adapted to permit the inflow of air from the free atmosphere at altitudes having sufficient atmospheric pressure to permit atmospheric breathing when no oxygen is being admitted to said pressure suit and said relief valve means is closed whereby the air in said pressure suit contains sufficient oxygen content for proper breathing at the various altitudes.

6. An automatic pressure control system for high altitude flying comprising a pressure suit in fluid connection with an oxygen supply having a constant preregulated flow, a pressure flow regulator valve means in said fluid connection having a differential pressure regulator valve actuating diaphragm one surface of which is subject to the pressure of said pressure suit for producing an opening force on said regulator valve means in addition to a regulator valve opening biasing means and the other surface of which is subject to pressure of said oxygen supply for producing a closing bias on said regulator valve, a dilution valve means operatively arranged between said regulator valve means and said pressure suit for admitting free atmosphere to be drawn into said fluid connection by the oxygen flow proportional to the altitude for maintaining sufficient oxygen concentration for a user in the various altitudes, an altitude controlled pressure relief valve means mounted in a wall of said pressure suit for regulating the pressure within said pressure suit in accordance with the various altitudes, said relief valve means being constructed and arranged to maintain the pressure in said pressure suit constant at or above a preselected altitude and to remain closed in the absence of oxygen being admitted to said pressure suit, means for preheating said oxygen or diluted oxygen prior to its entrance into said pressure suit to a temperature suitable for respiration of a wearer of said pressure suit, and a check valve mounted in said pressure suit adapted to permit the inflow of air from the free atmosphere at altitudes having sufficient atmospheric pressure to permit atmospheric breathing when no oxygen is being admitted to said pressure suit and said relief valve means is closed whereby the air in said pressure suit contains sufficient oxygen of a temperature for proper respiratory action at the various altitudes in ascent or descent.

HENRY L. BURNS.

REFERENCES CITED

The following references are of record in the file of this patent:

UNITED STATES PATENTS

| Number | Name | Date |
|---|---|---|
| 2,269,500 | Wildhack | Jan. 13, 1942 |
| 2,307,393 | Crawley | Jan. 5, 1943 |
| 2,404,020 | Akerman | July 16, 1946 |

FOREIGN PATENTS

| Number | Country | Date |
|---|---|---|
| 741,127 | France | Dec. 2, 1932 |

OTHER REFERENCES

Ser. No. 437,449, Richau (A. P. C.), pub. May 11, 1943.